US012570374B2

(12) United States Patent
Miyoshi

(10) Patent No.: US 12,570,374 B2
(45) Date of Patent: Mar. 10, 2026

(54) PERSONAL WATERCRAFT

(71) Applicant: Kawasaki Motors, Ltd., Hyogo (JP)

(72) Inventor: Masaaki Miyoshi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 743 days.

(21) Appl. No.: 17/873,152

(22) Filed: Jul. 26, 2022

(65) Prior Publication Data

US 2024/0034438 A1 Feb. 1, 2024

(51) Int. Cl.
*B63B 11/00* (2006.01)
*B63B 34/10* (2020.01)
*E05C 9/04* (2006.01)

(52) U.S. Cl.
CPC .............. *B63B 11/00* (2013.01); *B63B 34/10* (2020.02); *E05C 9/04* (2013.01)

(58) Field of Classification Search
CPC ......... B63B 19/00; B63B 19/12; B63B 19/14; B63B 19/24; B63B 2019/245; B63B 11/00; B63B 34/10; E05C 9/04; E05C 9/043; E05B 79/12; E05B 83/16; E05B 85/04; E05B 85/243
USPC .......... 114/55.53, 201 R, 203, 343, 364, 201
See application file for complete search history.

(56) References Cited

U.S. PATENT DOCUMENTS

| | | | | |
|---|---|---|---|---|
| 5,490,474 A * | 2/1996 | Ikeda | B63B 34/10 440/89 R |
| 6,234,546 B1 * | 5/2001 | Asakura | B62J 1/12 114/55.53 |
| 6,308,650 B1 * | 10/2001 | Tsumiyama | B63B 19/14 49/248 |
| 11,001,349 B1 | 5/2021 | Hisada et al. | |
| 2002/0053310 A1 * | 5/2002 | Ibata | B63B 19/14 114/55.53 |

* cited by examiner

*Primary Examiner* — Daniel V Venne
(74) *Attorney, Agent, or Firm* — XSENSUS LLP

(57) ABSTRACT

A personal watercraft includes a ship body, a luggage compartment provided in the ship body and provided with an opening for taking in and out luggage, a hatch attached to the ship body and capable of opening and closing the opening, and a lock mechanism for fixing the hatch to the ship body in a state where the opening is closed. The lock mechanism includes a plurality of lock portions that engage the hatch and the ship body with each other, one operation lever that causes the plurality of lock portions to unlock the engagement in an interlocking manner, and a transmission member that transmits an operation action of the operation lever to at least one of the plurality of lock portions to unlock the engagement of the lock portion.

18 Claims, 17 Drawing Sheets

PERSONAL WATERCRAFT

BACKGROUND

Technical Field

The present disclosure relates to a personal watercraft.

Background Art

U.S. Pat. No. 11,001,349B1 discloses a personal watercraft including a ship body provided with a luggage compartment for accommodating luggage of a driver, and a hatch pivotable with respect to the ship body and closing an upper surface opening of the luggage compartment.

Since the personal watercraft planes on the water, waves may also collide with a hatch portion of the ship body in planing on the sea accompanied by waves. In this case, a gap is generated in a seal portion of the hatch, which may cause water to enter the luggage compartment.

SUMMARY

An object of the present disclosure is to provide a personal watercraft including a hatch applied with a lock mechanism that is capable of suppressing entry of water into a luggage compartment and excellent in operability.

A personal watercraft according to one aspect of the present disclosure includes a ship body, a luggage compartment provided in the ship body and provided with an opening for taking in and out luggage, a hatch attached to the ship body and capable of opening and closing the opening, and a lock mechanism for fixing the hatch to the ship body in a state where the opening is closed. The lock mechanism includes a plurality of lock portions that engage the hatch and the ship body with each other, one operation lever that causes the plurality of lock portions to unlock the engagement in an interlocking manner, and a transmission member that transmits an operation action of the operation lever to at least one of the plurality of lock portions to unlock the engagement of the lock portion.

DETAILED DESCRIPTION

Embodiments of a personal watercraft 1 according to the present disclosure will be described below with reference to the drawings. Some drawings are given direction indication of front, rear, left, and right, and these directions coincide with directions viewed from a driver on the personal watercraft 1. In the embodiments described below, an example will be described in which the personal watercraft 1 is a jet propulsion type personal watercraft that navigates on water in reaction to water flow jetted rearward.

[Overall Structure of Personal Watercraft]

Figure 1:
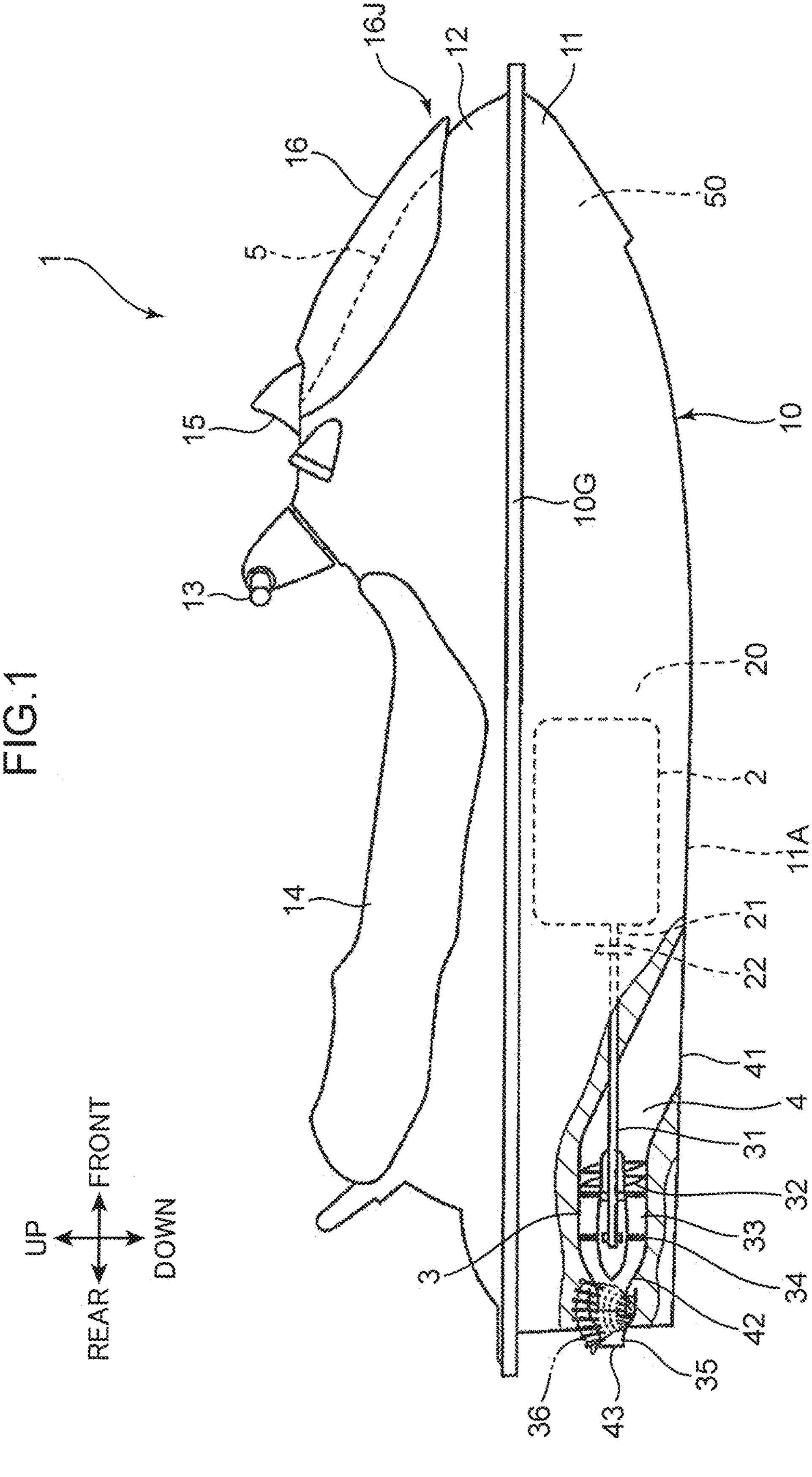
FIG. 1 is a partially broken side view of a personal watercraft according to a first embodiment of the present disclosure.
Figure 2:
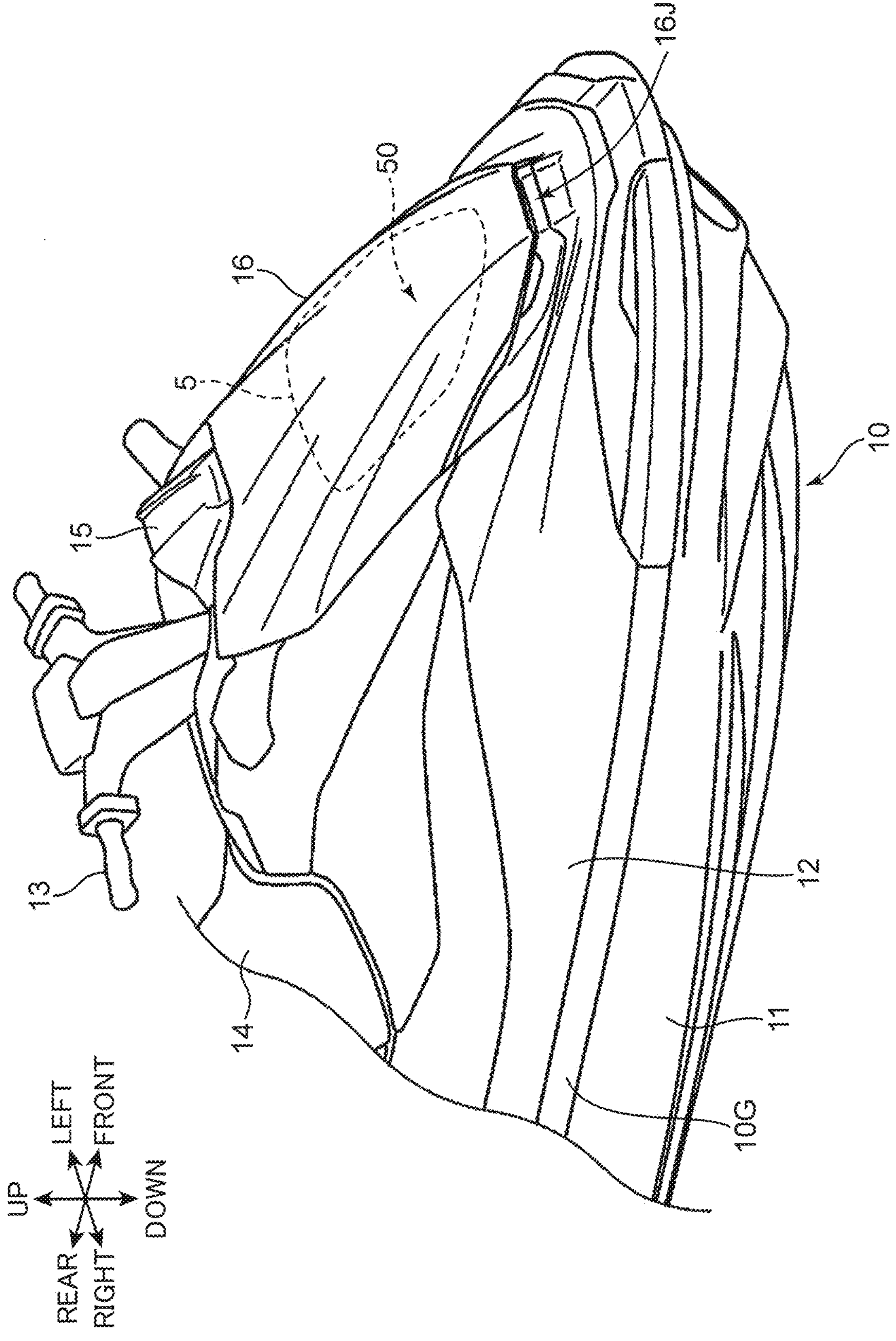
FIG. 2 is a perspective view of a front portion of the personal watercraft.

FIG. 1 is a partially broken side view of the personal watercraft 1, and FIG. 2 is a perspective view of the front portion of the personal watercraft 1. The personal watercraft is a straddle-type jet propulsion boat called a PWC (Personal Watercraft) that jets a water flow rearward and navigates in reaction to the water flow. The personal watercraft 1 includes a ship body 10, an engine 2, a jet pump 3, an impeller passage 4, and a luggage compartment 50.

The ship body 10 includes a hull 11 and a deck 12 covering the upper surface of the hull 11, and goes forward with jet water flows. The hull 11 and the deck 12 are connected to each other over the entire circumference by a gunnel line 10G. The deck 12 is provided with a handlebar 13, a driver seat 14, a display panel 15, and a front hatch 16 (hatch).

The handlebar 13 includes a throttle lever and is operated by the driver to steer the personal watercraft 1. The driver seat 14 is disposed at a substantially central position on the front, rear, left, and right of the deck 12, and is a seat on which the driver and a passenger ride. In the present embodiment, the driver seat 14 for three passengers including the driver is illustrated. The display panel 15 is disposed in front of the handlebar 13 and displays various types of information related to the navigation of the personal watercraft 1, such as a navigation speed, a remaining amount of fuel, and an operation mode.

The front hatch 16 is attached to the ship body 10 in front of the handlebar 13. The luggage compartment 50 capable of accommodating luggage is disposed in a front region of the ship body 10 relative to an engine room 20. In order to access the luggage compartment 50, a luggage compartment opening 5 for taking in and out luggage is provided in a front portion of the deck 12. The front hatch 16 is a door capable of opening and closing the luggage compartment opening 5. A coupling portion 16J that couples the front hatch 16 to the ship body 10 by hinge coupling is disposed at a front end of the front hatch 16. The user can expose the luggage compartment opening 5 by lifting a rear end of the front hatch 16 upward with the coupling portion 16J as a pivotal fulcrum.

The engine 2 is accommodated in the engine room 20 provided inside the hull 11. The engine 2 is, for example, a water-cooled four-stroke multicylinder engine using gasoline as fuel, and generates a driving force for driving the jet pump 3. The engine 2 includes a crankshaft 21 extending in the front-rear direction.

In order to apply a propulsive force to the personal watercraft 1, the jet pump 3 pressurizes and accelerates the water taken in the impeller passage 4 and injects the water rearward. The jet pump 3 includes a pump shaft 31, an impeller 32, a stator vane 33, a pump case 34, a jet nozzle 35, and a reverse gate 36. The front end of the pump shaft 31 is coupled to a coupling member 22 attached to the rear end of the crankshaft 21. The impeller 32 is attached to the rear end of the pump shaft 31.

The impeller 32 generates a jet water flow by rotating about an axis. The driving force of the engine 2 is transmitted to the impeller 32 via the crankshaft 21 and the pump shaft 31. The stator vane 33 is attached behind the impeller 32 and straightens a water flow generated by the impeller 32. The pump case 34 rotatably supports the rear end side of the pump shaft 31.

The jet nozzle 35 is disposed behind the pump case 34 and has an outlet port 43 for jetting a jet water flow generated by the impeller 32. The jet nozzle 35 has a tapered shape in which the passing water cross-sectional area decreases toward the rear. The jet nozzle 35 is pivotable about an axis extending in the up-down direction, and the jet direction of the jet water flow from the outlet port 43, that is, the propulsion direction of the personal watercraft 1 is changed to the left and right by the steering of the handlebar 13. The reverse gate 36 is attached to the jet nozzle 35 pivotably about an axis extending in the left-right direction. When the reverse gate 36 descends so as to cover the outlet port 43, the propulsion direction of the personal watercraft 1 is changed rearward.

The impeller passage 4 is provided in a rear region of the hull 11, and the impeller 32 is disposed. The impeller passage 4 includes, as a water intake opening, a water intake 41 disposed on a bottom surface 11A of the hull 11. The discharge opening of the impeller passage 4 is the outlet port 43 described above. The impeller passage 4 is a water passage for pressurizing, by the impeller 32, water taken in from the water intake 41 and injecting the water from the outlet port 43. The vicinity of the rear end of the impeller passage 4 is a tapered part 42 whose passing water cross-sectional area is gradually narrowed, and enters the front end of the jet nozzle 35.

[Outline of Hatch Structure and Lock Mechanism]

Figure 3:
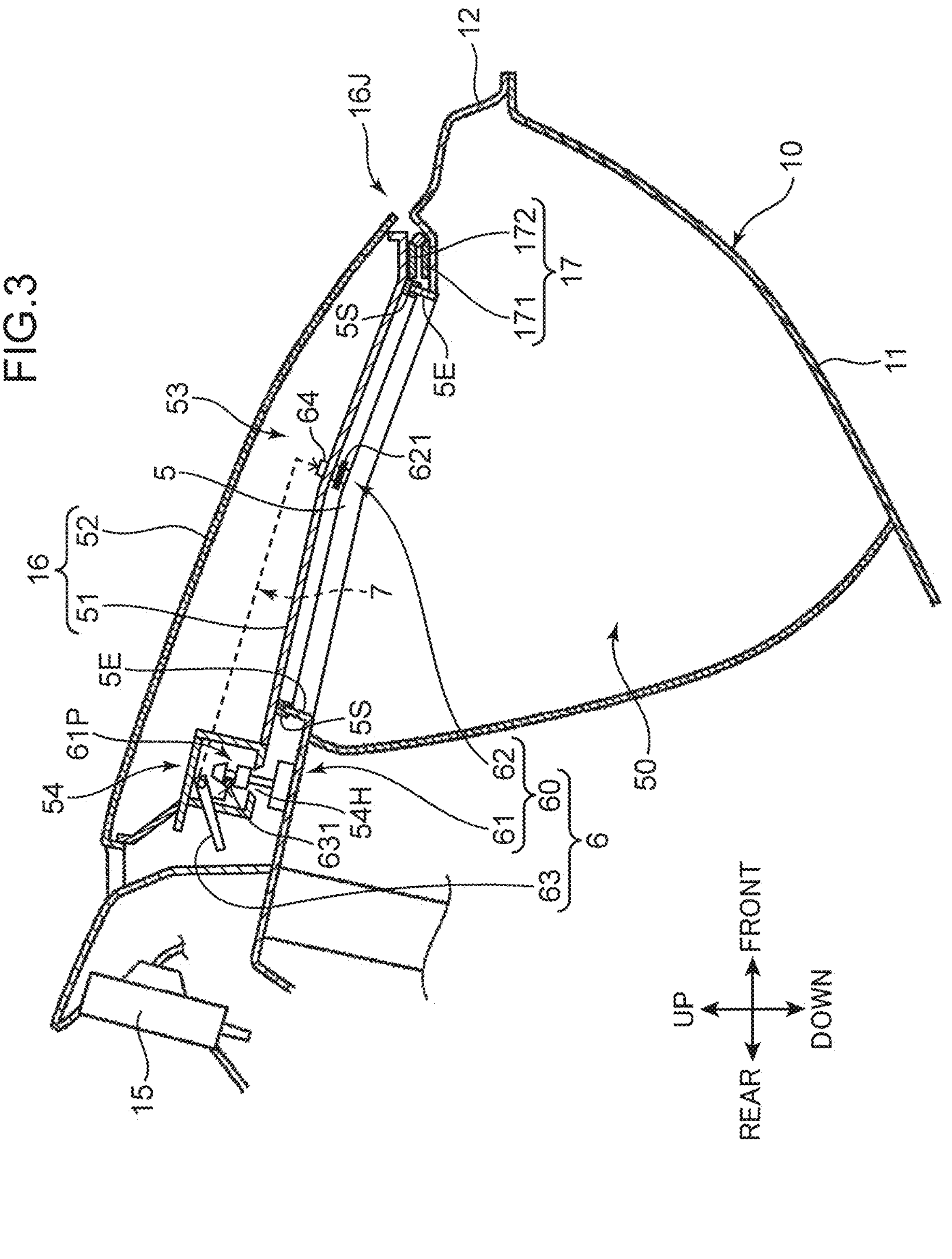
FIG. 3 is a cross-sectional view of a front portion of the personal watercraft.

FIG. 3 is a cross-sectional view of the front portion of the personal watercraft 1. The front hatch 16 includes a combination of an inner member 51 and an outer member 52. The inner member 51 is a plate constituting an inner surface side of the front hatch 16, and opposes the luggage compartment opening 5. In a state where the front hatch 16 is closed, the inner member 51 closes the luggage compartment opening 5. The outer member 52 is a plate constituting an outer surface side of the front hatch 16, and is attached to the inner member 51. An internal space 53 is provided between the inner member 51 and the outer member 52. The internal space 53 is a semi-sealed space defined by the inner member 51 and the outer member 52.

A hinge 17 is disposed in the coupling portion 161. The hinge 17 pivotably couples the front hatch 16 to the deck 12 at a position in front of the luggage compartment opening 5. That is, a first blade 171 of the hinge 17 is attached to the deck 12 at a position adjacent to a front periphery of the luggage compartment opening 5. A second blade 172 of the hinge 17 is attached to a lower surface near the front end of the inner member 51.

The personal watercraft 1 includes a lock mechanism 6 that fixes the front hatch 16 to the ship body 10 in a state where the luggage compartment opening 5 is closed. The lock mechanism 6 includes a plurality of lock portions 60, an operation lever 63 which is a single operation lever, and a transmission member 7. The plurality of lock portions 60 are members for engaging the front hatch 16 and the ship body 10 with each other, and in the present embodiment, include end lock portions 61 (first lock portions) and intermediate lock portions 62 (second lock portions). The operation lever 63 is provided for operation of the plurality of lock portions 60, and is a lever that causes the plurality of lock portions 60 to engage the front hatch 16 with the ship body 10 and to unlock the engagement in an interlocking manner. The transmission member 7 transmits the operation action of one operation lever 63 to the plurality of lock portions 60 to unlock the engagement of the lock portions 60. The transmission member 7 is disposed in the internal space 53 of the front hatch 16. In FIG. 3, the transmission member 7 is schematically illustrated for simplification of illustration.

Figure 4:
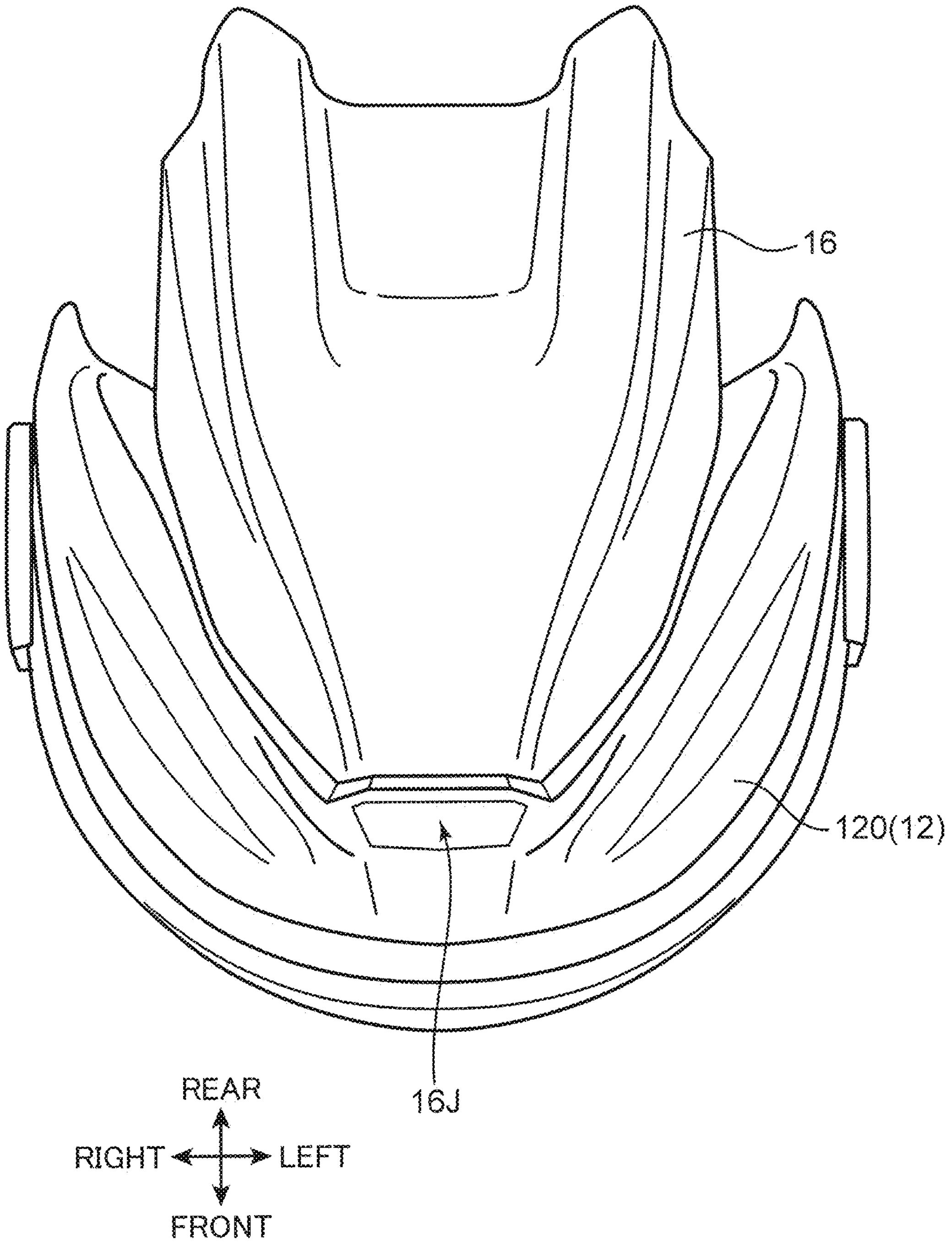
FIG. 4 is a plan view of a front portion of the personal watercraft, and is a view illustrating a state in which a front hatch is closed.
Figure 5:
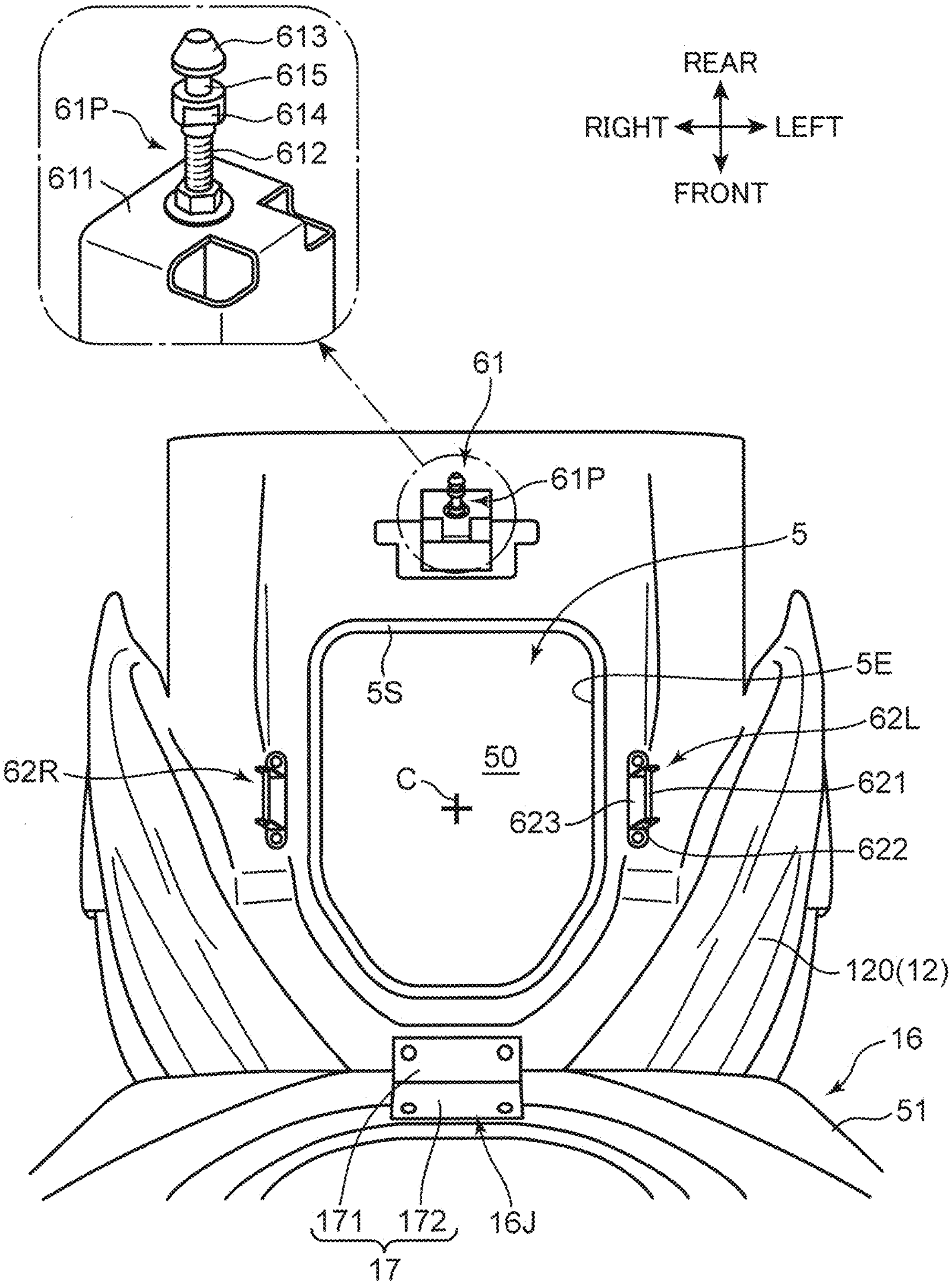
FIG. 5 is a view illustrating a state in which the front hatch is opened and the opening of a luggage compartment is exposed.
Figure 6:
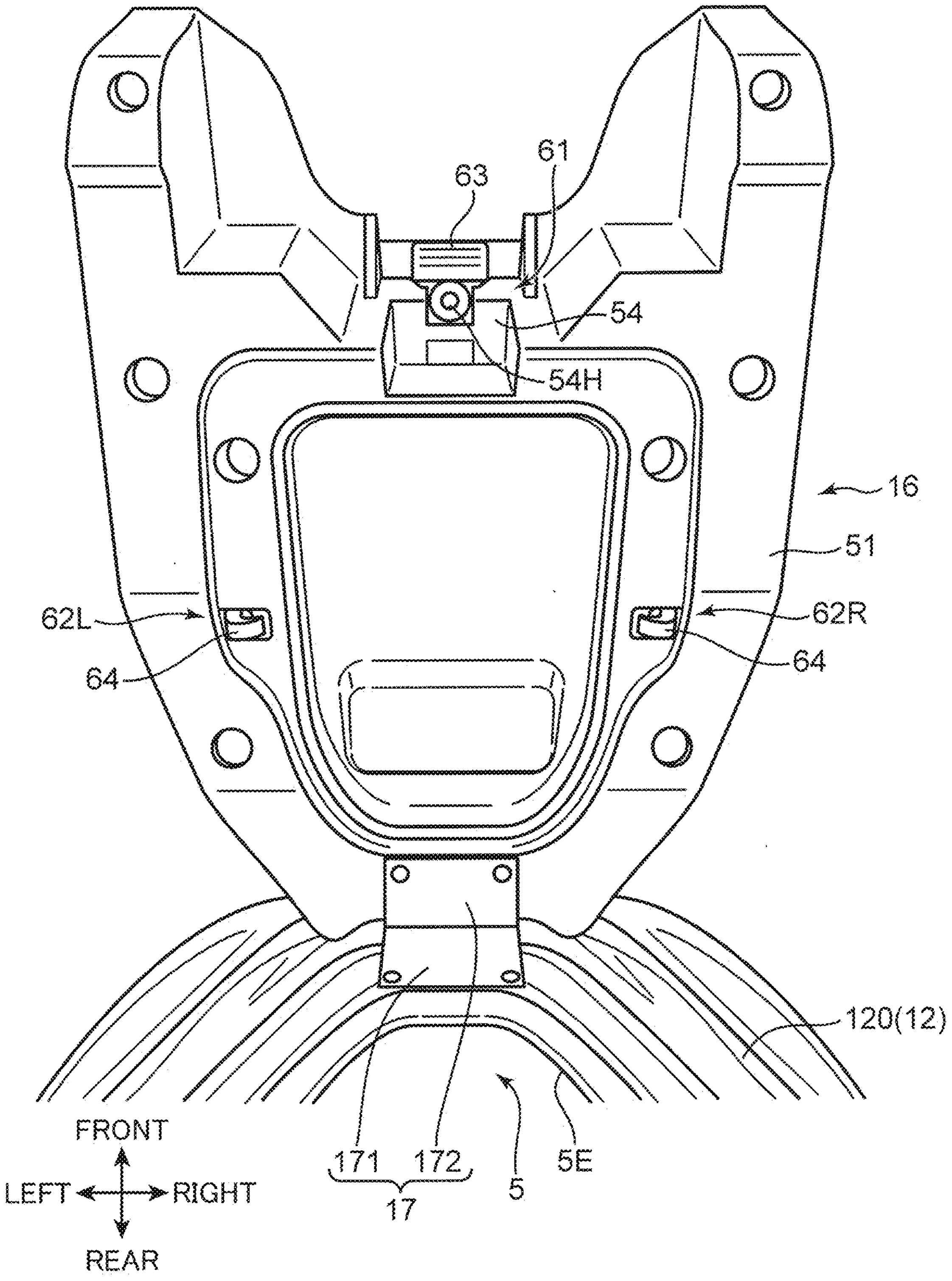
FIG. 6 is a view illustrating a bottom surface of the opened front hatch.

FIG. 4 is a plan view of a deck front portion 120, which is a front portion of the deck 12, and is a view illustrating a state in which the front hatch 16 is closed. In this state, the front hatch 16 is fixed to the ship body 10 by the lock mechanism 6. On the other hand, FIG. 5 is a view illustrating a state in which the front hatch 16 is opened and the luggage compartment opening 5 is exposed. When the front hatch 16 is opened, the operation lever 63 is operated, and the locked state by the lock portion 60 is unlocked. Then, when a lifting force is applied to the rear end of the front hatch 16, the front hatch 16 pivots about the axis of hinge 17 to be opened. FIG. 6 is a view illustrating a bottom surface of the opened front hatch 16.

The luggage compartment opening 5 is disposed in a central region of the deck front portion 120 in the left-right width direction. The coupling portion 16J having the hinge 17 is disposed on the front side of the luggage compartment opening 5 at a position corresponding to the center of the luggage compartment opening 5 in the width direction. Among the plurality of lock portions 60, the end lock portion 61 is disposed on the rear side of the luggage compartment opening 5. In the present embodiment, an example is illustrated in which the intermediate lock portion 62 is arranged on each of the left side and the right side of the luggage compartment opening 5, and includes a left intermediate lock portion 62L and a right intermediate lock portion 62R. That is, the coupling portion 16J, the end lock portions 61 as the plurality of lock portions 60, and the intermediate lock portions 62L and 62R are disposed so as to surround a periphery of the luggage compartment opening 5.

Constituent members of the lock portion 60 are disposed on the deck front portion 120 on the ship body 10 side and on the front hatch 16 side. As illustrated in FIG. 5, a locking pin 61P of the end lock portion 61 is erected on the deck front portion 120. Locking rods 621 (engaged rods) of the intermediate lock portions 62L and 62R are attached. On the other hand, as illustrated in FIG. 6, the front hatch 16 is equipped with an engagement box 54 to become an engagement destination of the locking pin 61P and an engagement member 64 to be engaged with the locking rod 621.

[Detailed Description of Lock Mechanism]

Although the outline of the lock mechanism 6 has been described above, the configuration of the lock mechanism 6 will be continuously described in detail.

<Arrangement of Lock Portion>

As described above, the lock portion 60 included in the lock mechanism 6 includes three, the end lock portion 61 disposed on the rear side of the luggage compartment opening 5, and the left intermediate lock portion 62L and the right intermediate lock portion 62R disposed on the left and right sides of the luggage compartment opening 5, respectively. Lock engagement of the end lock portion 61 is directly unlocked by the operation of the operation lever 63. On the other hand, lock engagement of the intermediate lock portions 62L and 62R disposed at positions separated from the end lock portion 61 is indirectly unlocked by the operation of the operation lever 63 via the transmission member 7. That is, the transmission member 7 simultaneously transmits the operation action of the operation lever 63 for unlocking the engagement of the end lock portion 61 to the two intermediate lock portions 62L and 62R. By including the transmission member 7, not only the end lock portion 61 but also the intermediate lock portions 62L and 62R can be unlocked only by operating one operation lever 63, and thus operability is excellent.

In the present embodiment, the coupling portion 161 is disposed on the front side of the luggage compartment opening 5, and the end lock portion 61 is disposed on the rear side that is the opposite side to the coupling portion 161 across the luggage compartment opening 5. The intermediate lock portions 62L and 62R are disposed between the coupling portion 16J and the end lock portion 61. In a modification, the coupling portion 161 may be disposed on the rear side of the luggage compartment opening 5, and the end lock portion 61 may be disposed on the front side. One of the left intermediate lock portion 62L and the right intermediate lock portion 62R may be omitted, or the number of intermediate lock portions 62 may be 3 or more.

The arrangement of the lock portion 60 will be further described. As illustrated in FIG. 5, the opening shape of the luggage compartment opening 5 in plan view is a bombshell shape that is long in the front-rear direction as a whole in which the rear region is rectangular and the front region is a mountain shape protruding forward. Such a shape is a shape matching the shape of the deck front portion 120. Of course, the opening shape of the luggage compartment opening 5 is discretionary, and may be, for example, rectangular, elliptical, or square as a whole.

A direction passing through a center C of the luggage compartment opening 5 in plan view and extending in the front-rear direction (discretionary horizontal direction) is a first direction, and a direction similarly passing through the center C and orthogonal to the first direction, that is, the left-right direction is a second direction. The coupling portion 16J is disposed on the front side that is one end side in the first direction of the luggage compartment opening 5, and the end lock portion 61 is disposed on the rear side that is the other end side in the first direction of the luggage compartment opening 5. The pair of intermediate lock portions 62L and 62R are disposed at both ends of the luggage compartment opening 5 in the second direction. That is, the left intermediate lock portion 62L is arranged on the left side that is one end side in the second direction, and the right intermediate lock portion 62R is arranged on the right side that is the other end side in the second direction.

In the personal watercraft of a comparative example, the front hatch 16 is fixed by one lock portion disposed at the position of the end lock portion 61 described above. On the other hand, according to the present embodiment, the front hatch 16 is fixed to the ship body 10 by the plurality of lock portions 60. For example, when the personal watercraft 1 sails on the waves, the ship body 10 is impacted by wave collision or the like. A pitching posture with respect to the horizontal plane during the sliding of the ship body 10 may change under the influence of waves, or the waves may collide with the front hatch 16 due to the non-uniform posture of the personal watercraft 1 by execution of turning slide or the like. Furthermore, a force in the direction of opening the front hatch 16 may acts in association with an impact or the like due to a wave collision on the deck 12. Thus, even when a force in the direction of opening the front hatch 16 acts on the ship body 10, rattling is less likely to occur in the front hatch 16 according to the present embodiment. In other words, generation of a gap between the front hatch 16 and the ship body 10 is prevented. Therefore, it is possible to suppress water from entering the luggage compartment 50 through a matching surface between the front hatch 16 and the ship body 10.

As illustrated in FIGS. 3 and 5, a seal member 5S is attached to a periphery 5E of the luggage compartment opening 5. The back surface side of the inner member 51 of the front hatch 16 is pressed against the seal member 5S, and the front hatch 16 is fixed by the lock mechanism 6 in a state where watertightness is secured. Since the front side of the front hatch 16 is attached to the deck 12 with the hinge 17, rattling is less likely to occur. On the other hand, when waves strongly collide from the left and right sides of the front hatch 16, the watertightness cannot be maintained due to the floating of the front hatch 16, and water may enter the luggage compartment 50. However, in the present embodiment, the coupling portion 16J, the end lock portion 61, and the pair of intermediate lock portions 62L and 62R are arranged at substantially equal intervals around the luggage compartment opening 5. Therefore, the front hatch 16 is fixed in a well-balanced manner, rattling of the front hatch 16 hardly occurs even when waves collide from the lateral direction, and watertightness of the luggage compartment 50 can be maintained.

In particular, in the present embodiment, the coupling portion 16J and the plurality of lock portions 60 are disposed at positions adjacent to the periphery 5E of the luggage compartment opening 5. In particular, the left intermediate lock portion 62L and the right intermediate lock portion 62R are close to the periphery 5E. Therefore, the pressing force of the inner member 51 against the seal member 5S can be easily increased, and the sealing property by the seal member 5S can be enhanced. Accordingly, the watertightness of the luggage compartment 50 is further enhanced.

<Structure of Lock Portion>

Next, the structure of the lock portion 60 will be described. The end lock portion 61 and the intermediate lock portions 62L and 62R included in the lock portion 60 are different types of lock portions having different engagement aspects. The end lock portion 61 includes the locking pin 61P disposed on the deck 12 side, that is, the ship body 10 side, and the engagement box 54 disposed on the front hatch 16 side.

Figure 7:
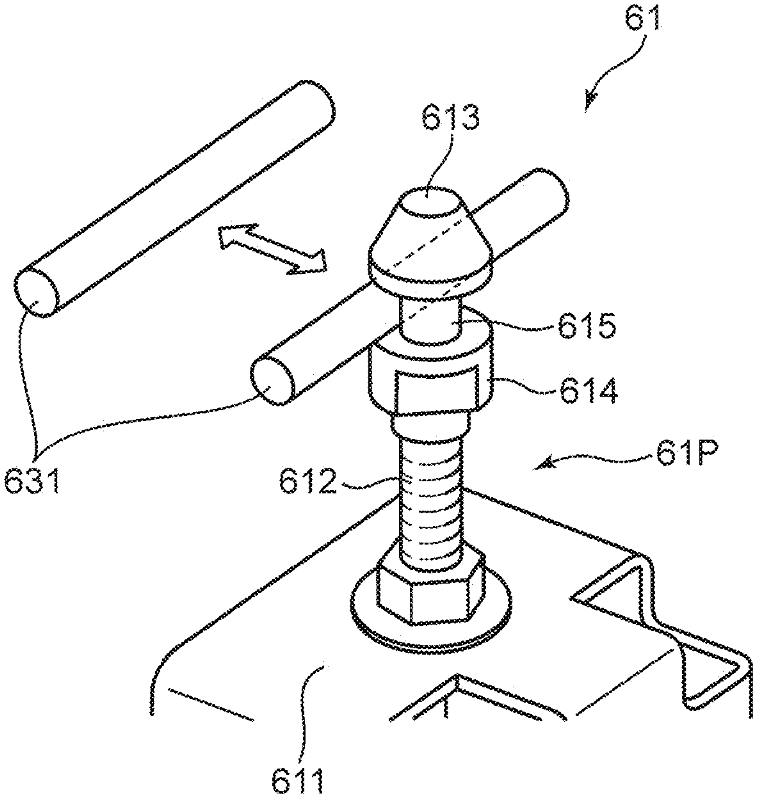
FIG. 7 is a perspective view of an end lock portion of a lock mechanism.

FIG. 5 includes an enlarged perspective view of the locking pin 61P. FIG. 7 is a perspective view illustrating the locking pin 61P and a locking bar 631 incorporated in the engagement box 54. The locking pin 61P is erected on a base frame 611 fixed to the deck front portion 120 behind the luggage compartment opening 5. The locking pin 61P includes a pin main body 612, a tip end portion 613, a large diameter portion 614, and a locking groove 615.

The pin main body 612 is a columnar portion extending vertically upward of the base frame 611, and a screw groove for adjusting the protruding height of the locking pin 61P is formed on the side peripheral surface. The tip end portion 613 is a mushroom-shaped member positioned at the tip end of the pin main body 612, and has a tapered shape in which the outer diameter gradually decreases from a lower portion having an outer diameter larger than that of the pin main body 612 toward an upper portion. The large diameter portion 614 is a cylindrical portion positioned below the tip end portion 613 and having an outer diameter larger than that of the pin main body 612. The large diameter portion 614 is disposed at a distance slightly larger than the outer diameter of the locking bar 631 to the tip end portion 613. The locking groove 615 is an annular groove appearing between the tip end portion 613 and the large diameter portion 614, each having a diameter larger than that of the pin main body 612.

The engagement box 54 is attached near the rear end of the inner member 51 of the front hatch 16 in correspondence with the erection position of the locking pin 61P. The engagement box 54 has a housing structure that movably houses the locking bar 631, and the operation lever 63 is pivotably assembled. A pin receiving hole 5411 for receiving the locking pin 61P is opened on the bottom surface of the engagement box 54. In a state where the front hatch 16 is closed, the locking pin 61P enters the engagement box 54 through the pin receiving hole 54H.

The locking bar 631 is a columnar member movable forward and backward with respect to the locking groove 615. As described later in detail with reference to FIG. 10, the forward and backward movement of the locking bar 631 is interlocked with the unlock operation of the operation lever 63. That is, in a state where the operation lever 63 is not operated, the locking bar 631 fits into the locking groove 615, and as a result, forms a locked state of the front hatch 16 by the end lock portion 61. On the other hand, when the operation lever 63 is operated, the locking bar 631 is disengaged from the locking groove 615, and the locked state is unlocked. Thus, the front hatch 16 can be pivoted around the hinge 17 to be able to open the luggage compartment opening 5.

Each of the left intermediate lock portion 62L and the right intermediate lock portion 62R includes the locking rod 621 disposed on the ship body 10 side and the engagement member 64 disposed on the front hatch 16 side. The locking rod 621 is a cylindrical rod arranged to extend in the front-rear direction. The front end and the rear end of the locking rod 621 are supported by a support piece 622, and the locking rod 621 is at a position higher than the upper surface of the deck front portion 120. A fixed base 623 is connected consecutively to the lower end of the pair of support pieces 622. The fixed base 623 is fixed to the deck front portion 120 on the left side and the right side of the periphery 5E of the luggage compartment opening 5 and outside relative to the seal member 5S.

Figure 8:
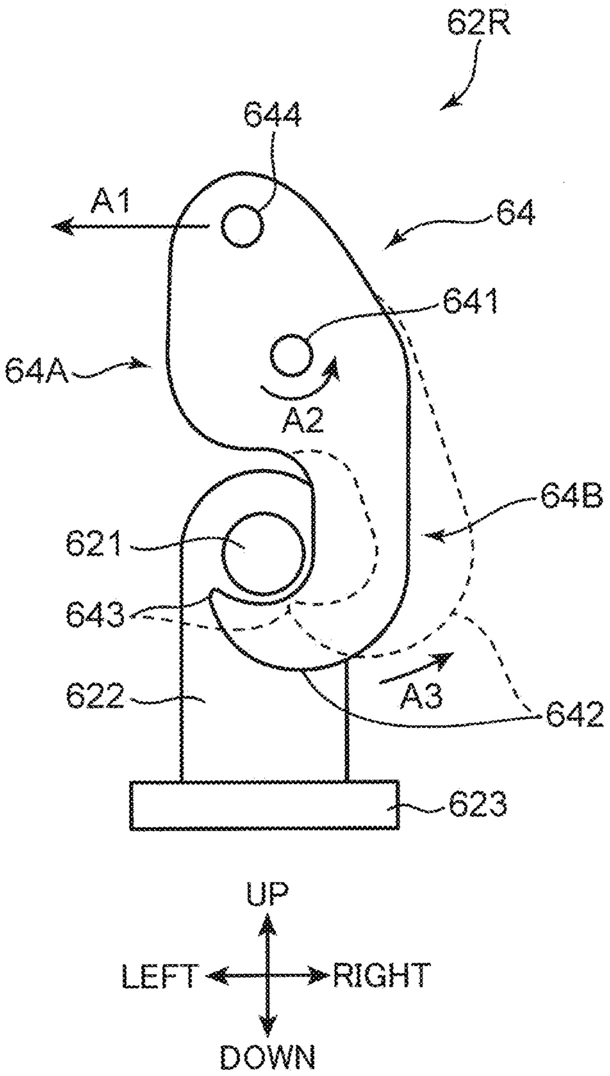
FIG. 8 is a front view of an intermediate lock portion of the lock mechanism.

The engagement members 64 of the intermediate lock portions 62L and 62R are assembled to the inner member 51 of the front hatch 16 at positions corresponding to the left and right locking rods 621. FIG. 8 is a front view of the right intermediate lock portion 62R. Since the left intermediate lock portion 62L has a symmetrical shape with the right intermediate lock portion 62R, the description will be omitted.

The engagement member 64 includes an upper portion 64A having a pivot shaft 641 and a lower portion 64B having a hook 642. The pivot shaft 641 is a shaft that pivots the engagement member 64. The hook 642 is a portion engageable with the locking rod 621, and has a curved inner surface along the outer peripheral surface of the locking rod 621. The state of FIG. 8 illustrates a locked state in which the hook 642 is engaged with the locking rod 621. In the locked state, a hook tip end 643 goes around to the left side of the locking rod 621, and the hook 642 and the locking rod 621 are engaged in the up-down direction.

A traction portion 644 is disposed at a position above and to the left of the pivot shaft 641 of the upper portion 64A. In the engagement member 64 in the locked state, when the traction force to the left acts on the traction portion 644 as indicated by an arrow A1, the engagement member 64 pivots counterclockwise about the pivot shaft 641 as indicated by an arrow A2. Then, as indicated by an arrow A3, the hook tip end 643 is separated rightward from the locking rod 621, and the hook 642 and the locking rod 621 do not overlap each other in the up-down direction and are in an unlocked state.

When the traction force of the arrow A1 is released, the engagement member 64 pivots clockwise about the pivot shaft 641, and the hook 642 engages with the locking rod 621 again so as to hold the locking rod 621 from the right side. When a wave collides with the front portion of the ship body 10 from the right side during navigation, a force for lifting the right side of the front hatch 16 in an obliquely left upward direction is likely to be applied. Even if such a force is applied, since the hook 642 holds the locking rod 621 from the right side, the engagement between the both is hardly disengaged. Rather, the inner peripheral surface of the hook 642 is pressed against the outer peripheral surface of the locking rod 621, and rattling is suppressed. In the left intermediate lock portion 62L not illustrated, the hook 642 has a structure of holding the locking rod 621 from the left side. Therefore, similarly to the right intermediate lock portion 62R, even if a wave collides with the ship body 10 from the left side and a force to lift the left side of the front hatch 16 in an obliquely right upward direction is applied, the engagement between the hook 642 and the locking rod 621 is hardly disengaged.

<Transmission Member>

Figure 9:
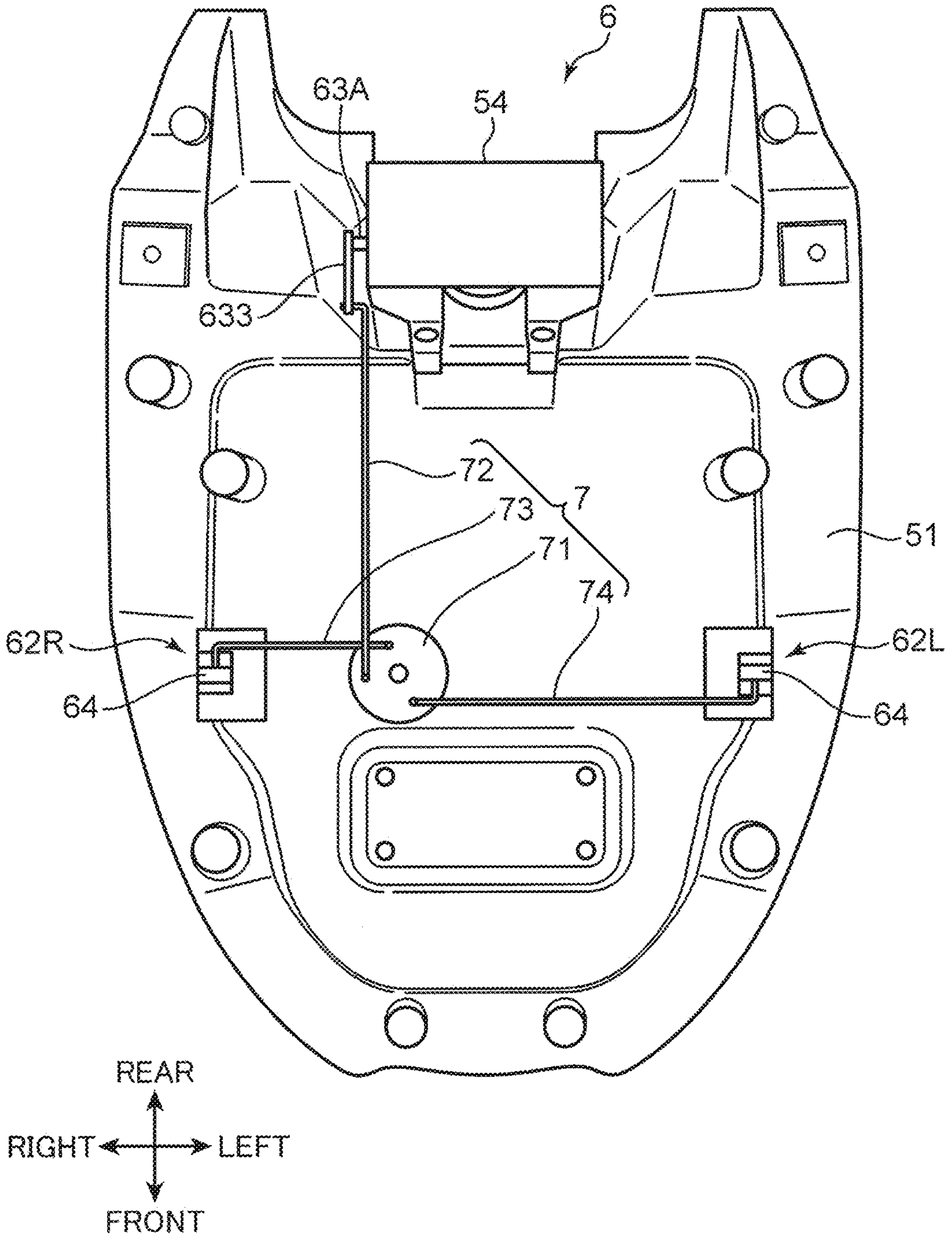
FIG. 9 is a top view of an inner member of the front hatch, and is a view illustrating an arrangement state of a transmission member.

FIG. 9 is a top view of the inner member 51 of the front hatch 16, and is a view illustrating an arrangement state of the lock portion 60 and the transmission member 7. The transmission member 7 is a member that transmits an operation force of the operation lever 63 with respect to the end lock portion 61 also to the intermediate lock portions 62L and 62R in an interlocking manner. The transmission member 7 includes a rotation plate 71 (displacement member), a first link rod 72 (main transmission member), a second link rod 73 (distribution transmission member), and a third link rod 74 (distribution transmission member). The transmission member 7 is disposed in the internal space 53 of the front hatch 16 and is not exposed to the outside. Therefore, the transmission member 7 is protected by the front hatch 16, and damage and deterioration thereof can be suppressed.

Figure 10:
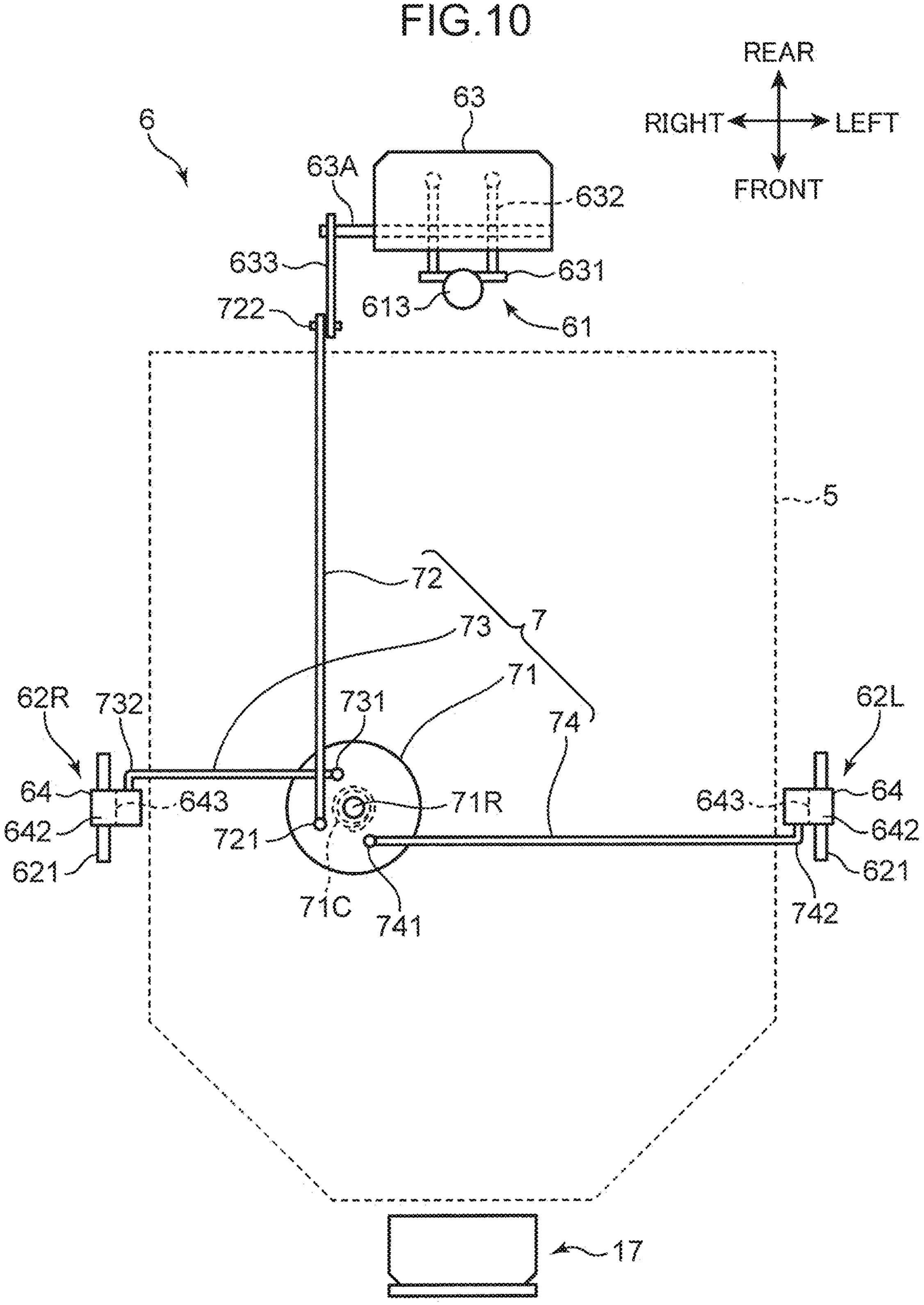
FIG. 10 is a schematic view of the lock mechanism, and is a view illustrating a locked state in which the front hatch is fixed.

FIG. 10 is a schematic view of the lock mechanism 6 illustrated in FIG. 9. The lock portion 60 and the transmission member 7 will be described with reference to FIG. 10. The operation lever 63 is swingable about a pivot shaft 63A. The pivot shaft 63A is pivotally supported by the engagement box 54 (FIG. 9). The operation lever 63 and the locking bar 631 constituting a part of the end lock portion 61 are coupled by an interlocking rod 632. When the user grips the operation lever 63 and swings the operation lever 63 about the pivot shaft 63A, the locking bar 631 moves in the front-rear direction via the interlocking rod 632. A pivot piece 633 is attached to a right end of the pivot shaft 63A. The pivot piece 633 swings integrally with the operation lever 63 and the pivot shaft 63A.

The rotation plate 71 is disposed on the upper surface of the inner member 51 at a substantially central position in the front-rear direction, at a position rightward from the center in the left-right direction. The rotation plate 71 is rotatably supported about a rotation shaft 71R erected on the inner member 51. A return spring 71C formed of a torsion coil spring is attached to the rotation shaft 71R. When the rotation plate 71 rotates clockwise in FIG. 10 about the rotation shaft 71R, the return spring 71C generates a biasing force for rotating the rotation plate 71 counterclockwise.

The first link rod 72 is a rod that is disposed so as to extend in the front-rear direction and couples the pivot piece 633 and the rotation plate 71. A front end 721 of the first link rod 72 is coupled in an aspect of a link pin in the direction of approximately 8 o'clock of the rotation plate 71 when the rotation shaft 71R is regarded as a clock shaft. A rear end 722 of the first link rod 72 is coupled to the tip end of the pivot piece 633 with a link pin. When the pivot piece 633 swings by the operation of the operation lever 63, the operation force is transmitted to the rotation plate 71 via the first link rod 72, and the rotation plate 71 rotates (displaces) about the rotation shaft 71R.

The second link rod 73 is a rod that is disposed so as to extend in the left-right direction and couples the engagement member 64 of the right intermediate lock portion 62R and the rotation plate 71. A left end 731 of the second link rod 73 is coupled in an aspect of a link pin in the direction of approximately 12 o'clock of the rotation plate 71. A right end 732 of the second link rod 73 is in link connection with the traction portion 644 of the engagement member 64. The second link rod 73 transmits the rotational force of the rotation plate 71 as power for unlocking the engagement between the engagement member 64 of the right intermediate lock portion 62R and the locking rod 621.

The third link rod 74 is a rod that is disposed so as to extend in the left-right direction and couples the engagement member 64 of the left intermediate lock portion 62L and the rotation plate 71. A right end 741 of the third link rod 74 is coupled in an aspect of a link pin in the direction of approximately 5 o'clock of the rotation plate 71. A left end 742 of the third link rod 74 is in link connection with the traction portion 644 of the engagement member 64. The third link rod 74 transmits the rotational force of the rotation plate 71 as power for unlocking the engagement between the engagement member 64 of the left intermediate lock portion 62L and the locking rod 621.

At least one of the three link rods 72, 73, and 74 may be formed of a wire instead of the link rod. In this case, a spring member such as a torsion coil spring that generates a biasing force for returning the posture of the engagement member 64 to the locked posture is interposed in the pivot shaft 641.

Figure 11:
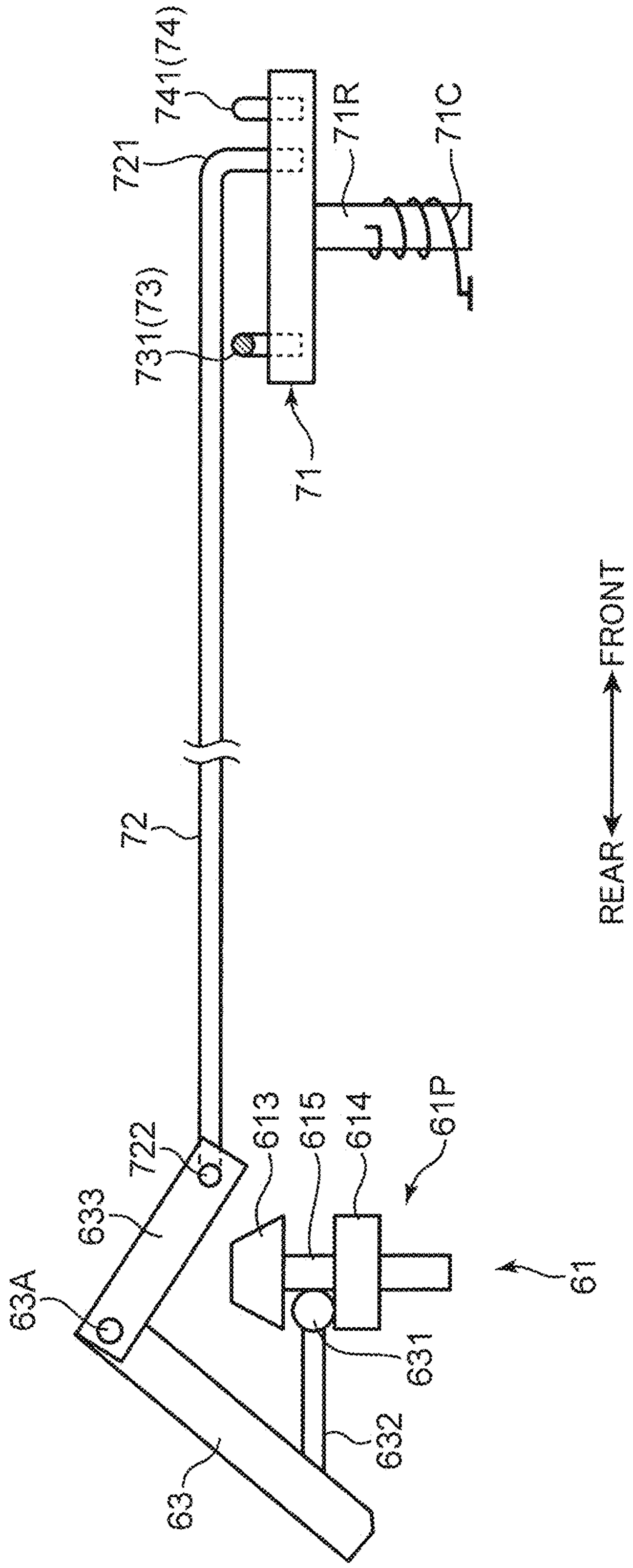
FIG. 11 is a view illustrating a posture of the end lock portion in the locked state.

Next, the action of the transmission member 7 will be described. FIG. 10 is also a view illustrating a locked state in which the lock mechanism 6 fixes the front hatch 16. FIG. 11 is a view illustrating a posture of the end lock portion 61 in the locked state. The locking bar 631 is fitted into and engaged with the locking groove 615 of the locking pin 61P. The hook 642 of the engagement members 64 included in each of the left intermediate lock portion 62L and the right intermediate lock portion 62R is engaged with the locking rod 621. That is, each hook tip end 643 is positioned inside relative to the locking rod 621.

Figure 12:
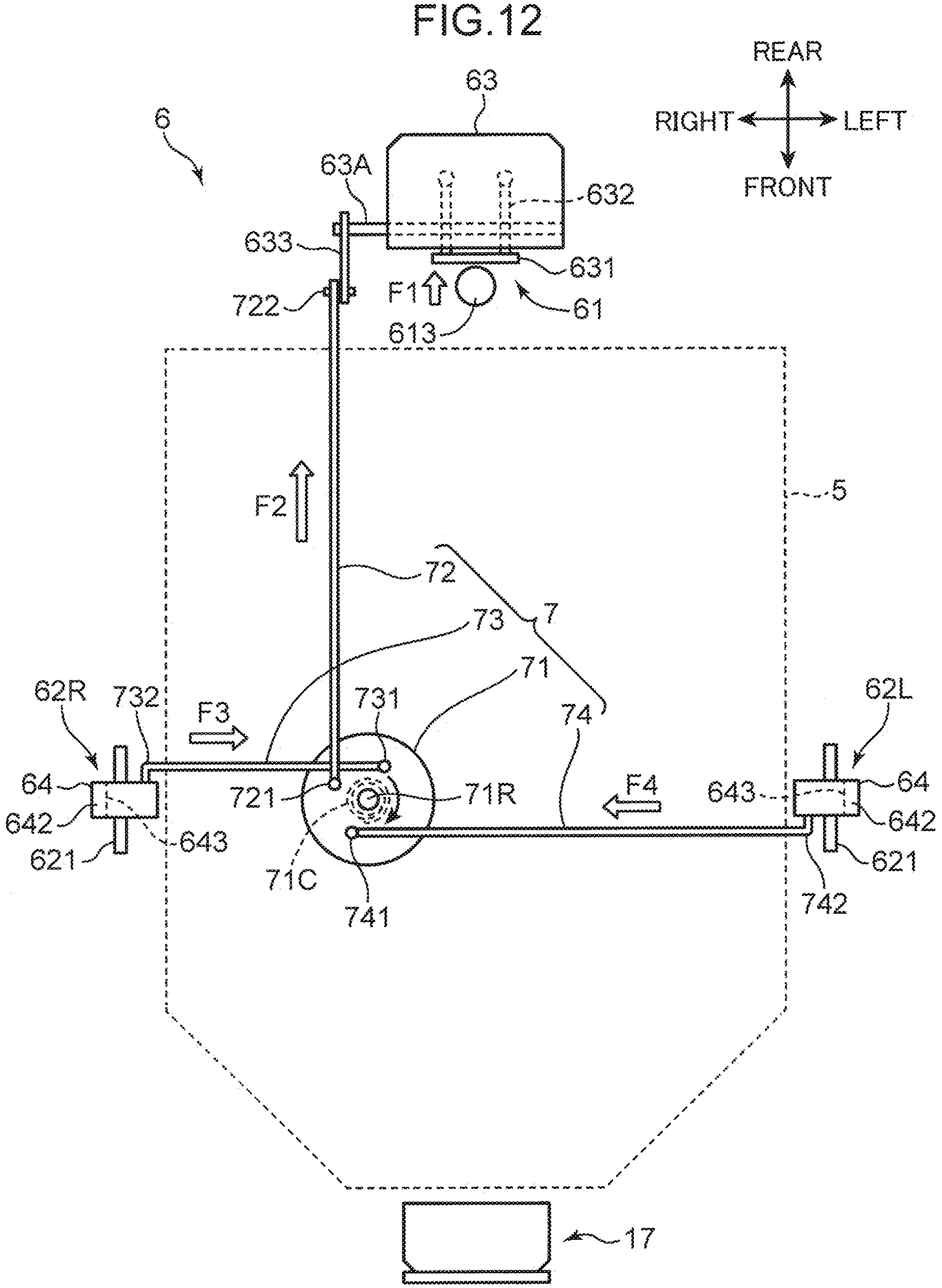
FIG. 12 is a schematic view of the lock mechanism, and is a view illustrating an unlocked state in which fixing of the front hatch is unlocked.
Figure 13:
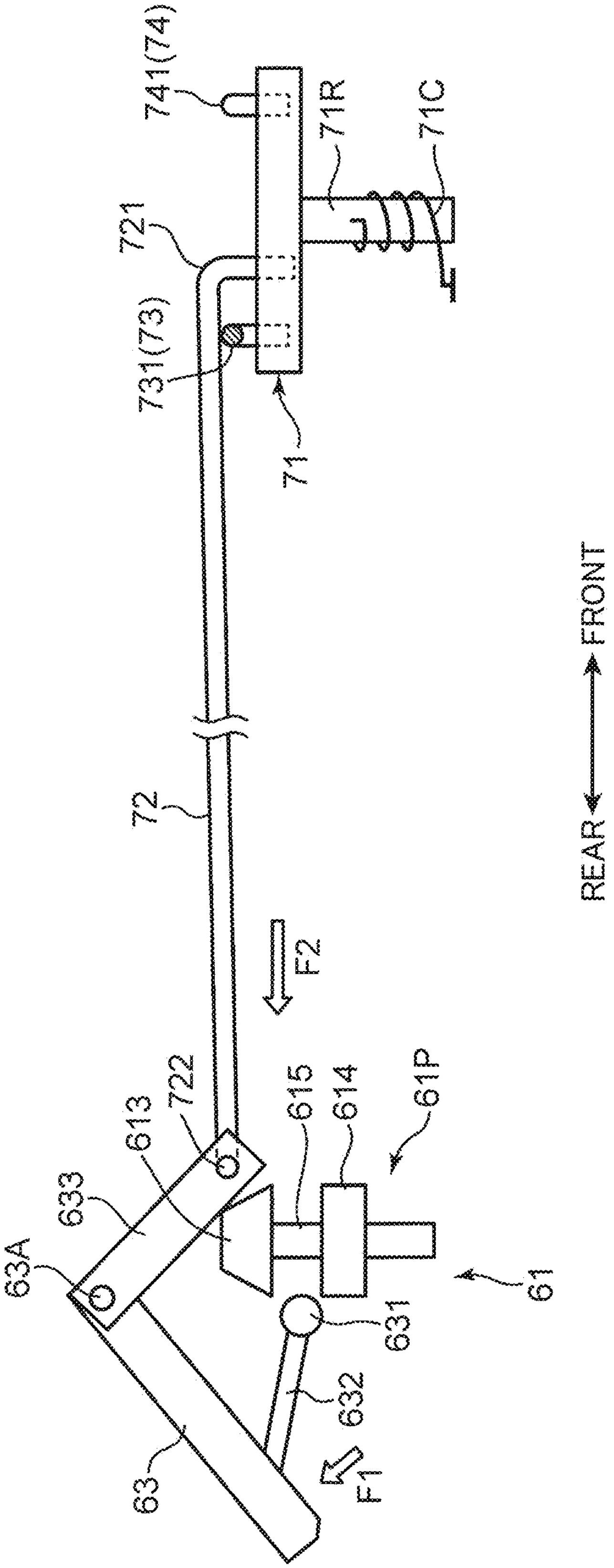
FIG. 13 is a view illustrating a posture of the end lock portion in the unlocked state.

FIG. 12 is a view illustrating an unlocked state in which the lock mechanism 6 unlocks the fixing of the front hatch 16. FIG. 13 is a view illustrating a posture of the end lock portion 61 in the unlocked state. When the user applies an operation force F1 for pulling up the operation lever 63, the operation lever 63 pivots about the pivot shaft 63A. By this pivot, the locking bar 631 coupled to the operation lever 63 by the interlocking rod 632 moves rearward and is disengaged from the locking groove 615 of the locking pin 61P. Therefore, the lock of the end lock portion 61 is unlocked.

At the same time, with the pivot of the pivot shaft 63A, the pivot piece 633 swings clockwise with the pivot shaft 63A as a pivot center. Due to this, the first link rod 72 is towed, and a displacement force F2 for rotating the rotation plate 71 is generated. That is, the first link rod 72 is towed rearward by the swing of the pivot piece 633, and the displacement force F2 acts on the rotation plate 71 from the front end 721 to rotate the rotation plate 71 clockwise about the rotation shaft 71R.

The displacement force F2 of the first link rod 72 causes the second link rod 73 to generate a traction force F3 and the third link rod 74 to generate a traction force F4. That is, when the rotation plate 71 rotates clockwise, the second link rod 73 is towed leftward by the traction force F3. Due to this, the engagement between the hook 642 of the engagement member 64 of the right intermediate lock portion 62R and the locking rod 621 on the right side is unlocked. Similarly, when the rotation plate 71 rotates clockwise, the third link rod 74 is towed rightward by the traction force F4. Due to this, the engagement between the hook 642 of the engagement member 64 of the left intermediate lock portion 62L and the locking rod 621 on the left side is unlocked.

Figure 14:
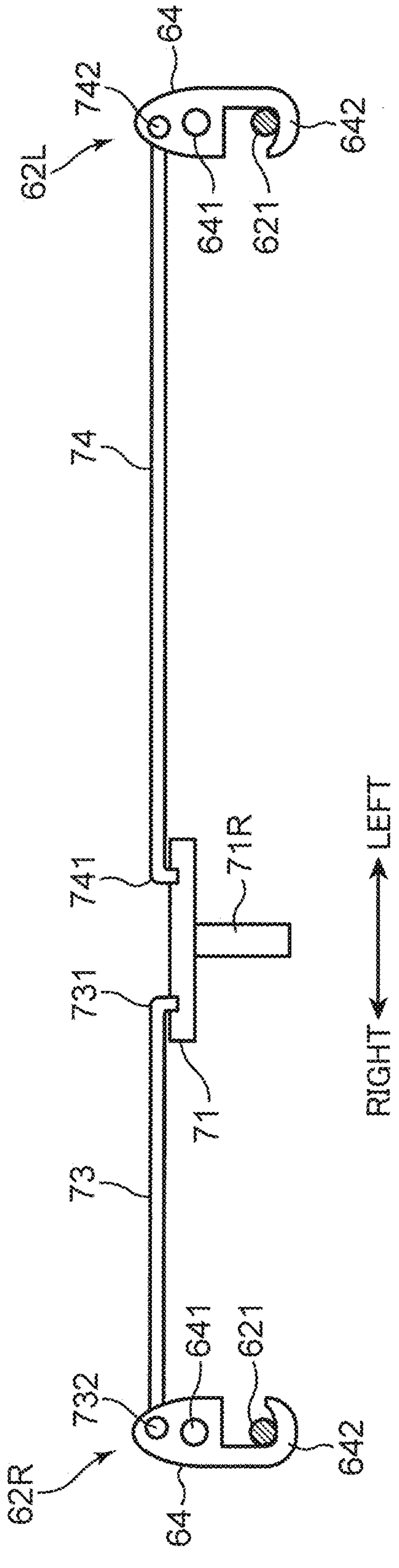
FIG. 14 is a view illustrating a posture of an intermediate lock portion in the locked state.
Figure 15:
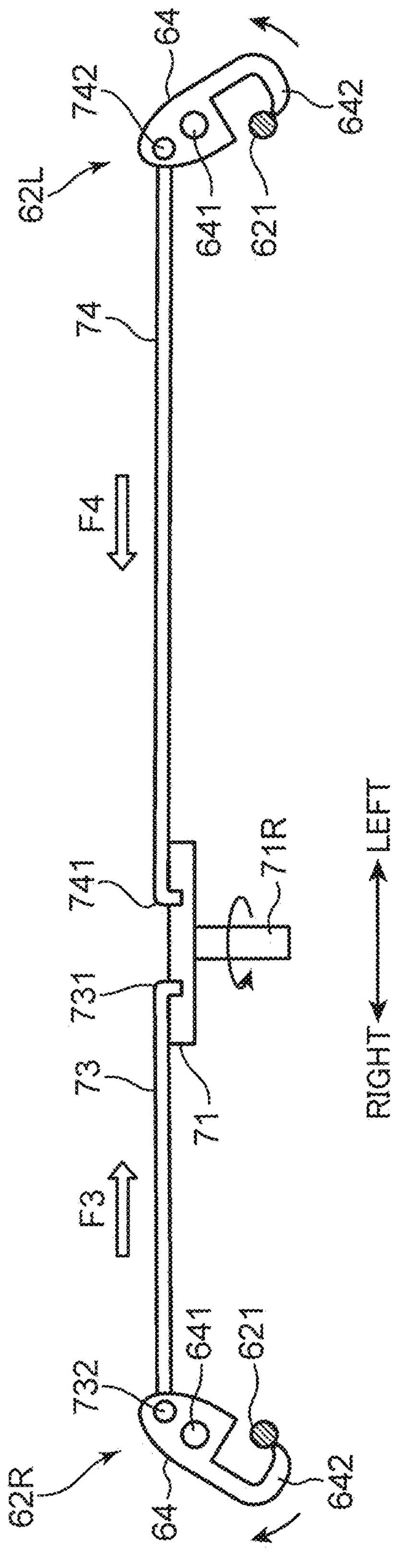
FIG. 15 is a view illustrating a posture of the intermediate lock portion in the unlocked state.

FIG. 14 is a view illustrating a posture of the engagement member 64 in the locked state, and FIG. 15 is a view illustrating a posture of the engagement member 64 in the unlocked state. In the locked state of FIG. 14, the engagement member 64 is in a suspended state, and the hook 642 is engaged with the locking rod 621. On the other hand, in the unlocked state of FIG. 15, the engagement member 64 pivots about the pivot shaft 641 and in a state of swinging outward.

Specifically, in the right intermediate lock portion 62R, the engagement member 64 pivots clockwise about the pivot shaft 641 by being towed leftward at the right end 732 of the second link rod 73. Due to this, the hook 642 swings rightward and does not overlap the locking rod 621 on the right side in the up-down direction, and the engagement between the both is in an unlocked state. In the left intermediate lock portion 62L, the engagement member 64 pivots counterclockwise about the pivot shaft 641 by being towed leftward at the left end 742 of the third link rod 73. Due to this, the hook 642 swings leftward and does not overlap the locking rod 621 on the left side in the up-down direction, and the engagement between the both is in an unlocked state.

When the user does not apply the operation force F1 to the operation lever 63, that is, when the user releases the operation lever 63, the operation lever 63 returns to the posture of FIG. 11 by a biasing mechanism not illustrated. Due to this, the locking bar 631 moves forward and fits into the locking groove 615 again, and the end lock portion 61 is in a locked stated. In conjunction with this action, contrary to the state of FIG. 12, the first link rod 72 is pushed forward, and the rotation plate 71 rotates counterclockwise. Then, pull-back forces in directions opposite to the traction forces F3 and F4 are generated in the second and third link rods 73 and 74, respectively, and the engagement member 64 is returned to the locked state illustrated in FIG. 14.

As described above, by applying the operation force F1 to one operation lever 63, the lock of the end lock portion 61, the left intermediate lock portion 62L, and the right intermediate lock portion 62R can be unlocked by the action of the transmission member 7. The unlocking allows the front hatch 16 to pivot about the axis of hinge 17. Therefore, the user such as a driver can open the front hatch 16 to expose the luggage compartment opening 5 and access the luggage compartment 50. When the opened front hatch 16 is closed, the front hatch 16 is closed in a state where the operation force F1 is applied to the operation lever 63, and then the operation force F1 is released, so that the end lock portion 61 and the intermediate lock portions 62L and 62R can be returned to the locked state.

Other Embodiments

Figure 16:
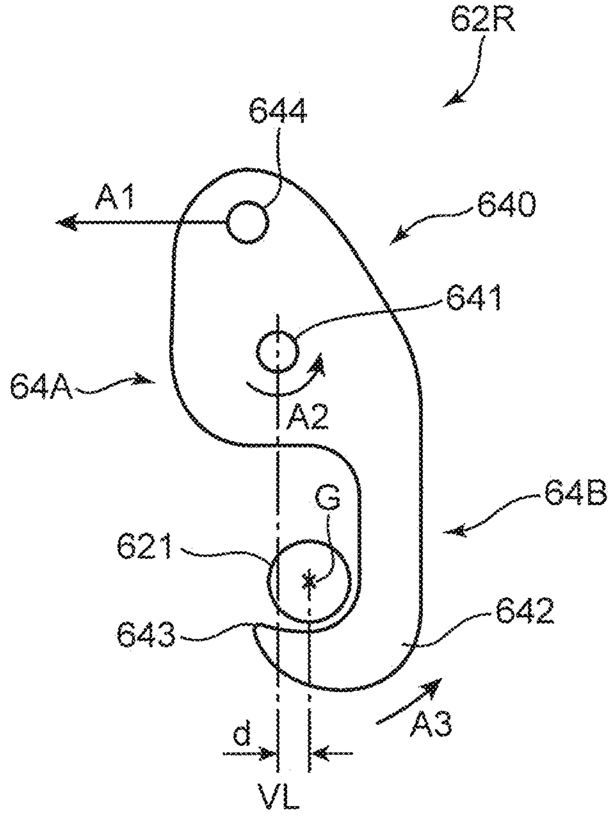
FIG. 16 is a view illustrating a desirable aspect of a hook of the intermediate lock portion.

Although one embodiment of the present disclosure has been described above, the present disclosure is not limited to the above embodiment. FIG. 16 is a view illustrating an engagement member 640 according to a modification of the engagement member 64 of the right intermediate lock portion 62R illustrated in FIG. 8. The engagement member 640 includes the upper portion 64A having the pivot shaft 641 and the lower portion 64B having the hook 642, and is the same as the engagement member 64 of FIG. 8 in the basic configuration in which the hook 642 engages with the locking rod 621. However, the engagement member 640 has a characteristic that the engagement member 64 described above does not have in a positional relationship between the pivot shaft 641 and the locking rod 621.

In a state where the traction force indicated by the arrow A1 is not applied to the traction portion 644 and the engagement member 640 is suspended, the pivot direction when the engagement member 640 unlocks the engagement with the locking rod 621 is the direction of the arrow A3 in the figure. In this pivot direction A3, a shaft center G of the locking rod 621 is disposed downstream by a predetermined distance d relative to a virtual line VL extending vertically downward from the center of the pivot shaft 641.

According to the aspect of FIG. 16, the engagement state of the engagement member 640 with respect to the locking rod 621 can be maintained by the own weight of the engagement member 640. When the traction force of the arrow A1 acts on the traction portion 644 of the engagement member 640, the engagement member 640 pivots counterclockwise about the pivot shaft 641 (arrow A2), the hook tip end 643 is separated rightward from the locking rod 621 (arrow A3), and the lock is unlocked. In this unlocked state, it is assumed that a failure occurs in a spring or the like that returns, for example, the transmission member 7 or the engagement member 640 to the suspended posture. Also in this case, since the positional relationship between the locking rod 621 and the pivot shaft 641 is set as described above, the engagement member 640 pivots clockwise about the pivot shaft 641 by the own weight of the engagement member 640, and can naturally take a suspended posture. Therefore, the hook 642 is engaged with the locking rod 621, and the locked state of the front hatch 16 can be maintained.

Figure 17:
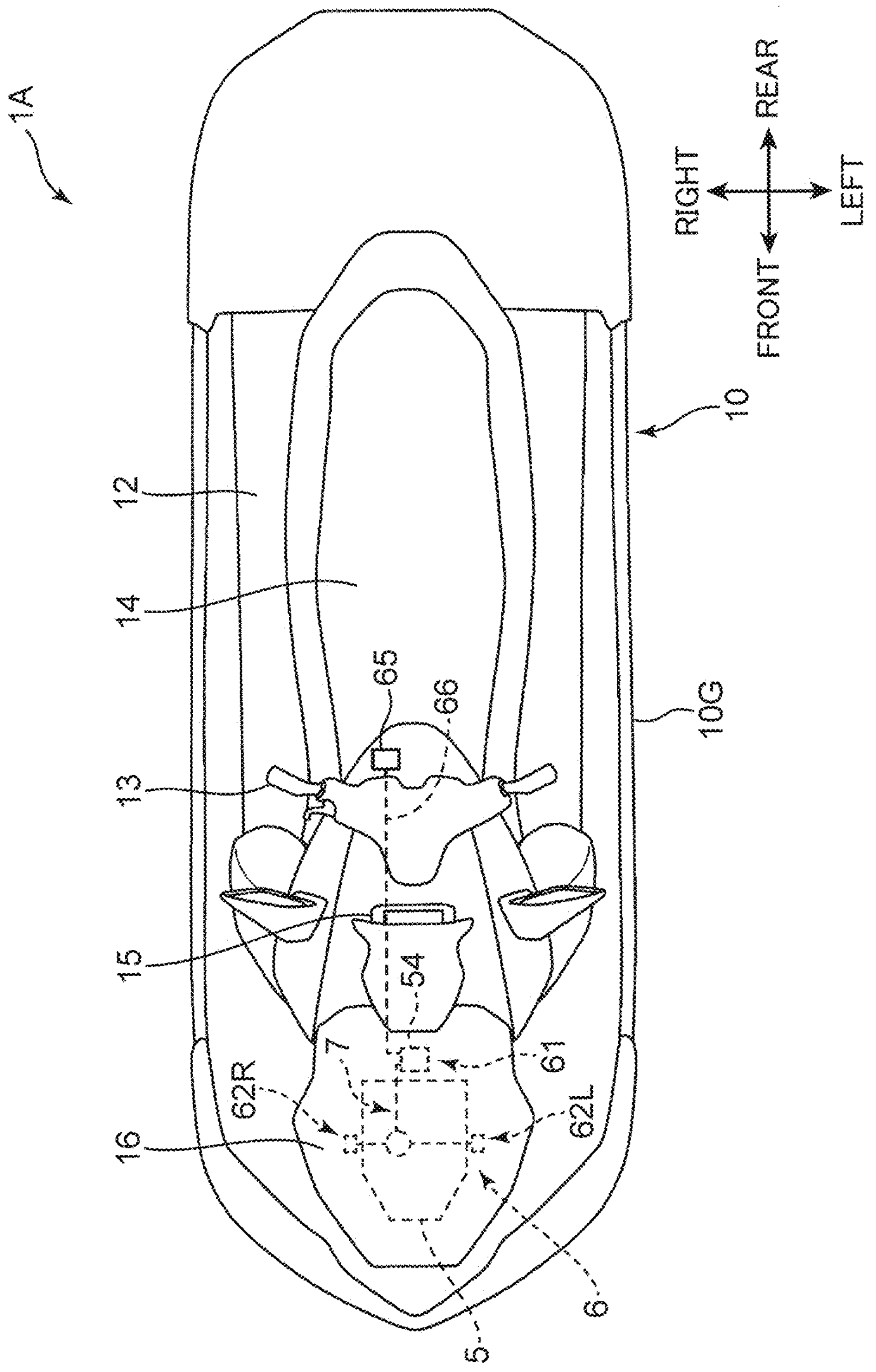
FIG. 17 is a view illustrating another arrangement example of an operation lever.

FIG. 17 is a top view of a personal watercraft 1A illustrating another arrangement example of the operation lever. Similarly to the above embodiment, the personal watercraft 1A includes the lock mechanism 6 including the end lock portion 61, the intermediate lock portions 62L and 62R, and the transmission member 7. A difference from the above embodiment is that a remote operation lever 65 is disposed at a position separated from the end lock portion 61 and the intermediate lock portions 62L and 62R. The remote operation lever 65 may be provided at a position opposing the driver seat 14, for example, at the handlebar 13 or near the display panel 15. Due to this, the driver can perform an opening/closing operation of the front hatch 16 in a state of being seated on the seat 14, and the convenience can be further improved. In the present example, the remote operation lever 65 is disposed in the vicinity of the handlebar 13 of the driver seat 14, and can operate the end lock portion 61 and the intermediate lock portions 62L and 62R. In the above embodiment, an example in which the operation lever 63 is incorporated in the engagement box 54 has been described, and in the example of FIG. 17, a mechanism for moving the locking bar 631 in the engagement box 54 and the remote operation lever 65 are connected by a wire 66 (transmission member), and the locking bar 631 can be remotely operated.

According to the aspect of FIG. 17, the operation force of the remote operation lever 65 is transmitted to the lock portion 60 by the wire 66 and the transmission member 7. The remote operation lever 65 is disposed near the driver seat where the driver can easily operate. For this reason, the unlocking of the front hatch 16 can be easily performed, and an opening/closing work of the front hatch 16 on water can be particularly facilitated.

Other than this, the following modified embodiments may be adopted.

In the above embodiment, the engine 2 having an internal combustion engine has been exemplified as the propulsion drive source of the personal watercraft 1, but a propulsion drive source other than the engine 2 may be used. For example, a drive source using an electric motor or a hybrid drive source of an electric motor and an engine may be used.

In the above embodiment, an example in which the personal watercraft 1 is a jet propulsion type watercraft has been described. The personal watercraft according to the present disclosure may be a personal watercraft other than the jet propulsion type. In particular, the present disclosure is preferably applied to a personal watercraft of a riding type in which a sport operation in which severe swinging of a ship body, sudden turning, and the like frequently occur is relatively easily performed.

SUMMARY OF PRESENT DISCLOSURE

The specific embodiments described above include a disclosure having the following configurations.

The personal watercraft according to a first aspect of the present disclosure includes a ship body, a luggage compartment provided in the ship body and provided with an opening for taking in and out luggage, a hatch attached to the ship body and capable of opening and closing the opening, and a lock mechanism for fixing the hatch to the ship body in a state where the opening is closed. The lock mechanism includes a plurality of lock portions that engage the hatch and the ship body with each other, one operation lever that causes the plurality of lock portions to unlock the engagement in an interlocking manner, and a transmission member that transmits an operation action of the operation lever to at least one of the plurality of lock portions to unlock the engagement of the lock portion.

According to the first aspect, since the hatch is fixed to the ship body by the plurality of lock portions, rattling of the hatch is less likely to occur, even when a strong impact is received due to wave collision or the like during sailing on the waves, for example. Therefore, it is possible to suppress water from entering the luggage compartment through the matching surface between the hatch and the ship body. Since the engagement of the plurality of lock portions can be unlocked in an interlocking manner with one operation lever, operability of unlocking is also excellent.

A personal watercraft according to a second aspect is the personal watercraft of the first aspect, in which the plurality of lock portions include a first lock portion in which the engagement is unlocked by operation of the operation lever, and a second lock portion disposed at a position separated from the first lock portion, and the transmission member transmits, to the second lock portion, an operation action of the operation lever for unlocking engagement of the first lock portion.

According to the second aspect, the engagement of the second lock portion can also be unlocked only by performing the disengagement action on the first lock portion scheduled to be disengaged by the operation of the operation lever, and the operability can be further improved.

The personal watercraft according to a third aspect is the personal watercraft of the second aspect, in which the hatch includes an inner member opposing the opening, an outer member attached to the inner member, and an internal space defined by the inner member and the outer member, and the transmission member is disposed in the internal space.

According to the third aspect, the transmission member is not exposed to the outside because it is arranged in the internal space of the hatch. Therefore, the transmission member is protected by the hatch, and damage and deterioration thereof can be suppressed.

The personal watercraft according to a fourth aspect is the personal waterraft of the first to third aspects, in which the ship body includes a hull and a deck covering an upper surface of the hull, and the opening of the luggage compartment is disposed in a front portion of the deck.

According to the fourth aspect, the fixed state of the hatch that closes the opening of the luggage compartment disposed in the front portion of the deck that is susceptible to wave collision during sailing on the waves can be enhanced by the engagement of the plurality of lock portions.

The personal watercraft according to a fifth aspect is the personal watercraft of the fourth aspect, in which the hatch has a coupling portion to be coupled with the deck.

According to the fifth aspect, since the hatch is engaged with the deck by the plurality of lock portions and the coupling portion, the fixed state of the hatch can be further strengthened.

The personal watercraft according to a sixth aspect is the personal watercraft of the fifth aspect, in which when a direction passing through a center of the opening in plan view and extending in a discretionary horizontal direction is a first direction, the coupling portion is disposed on one end side of the opening in the first direction, and the plurality of lock portions include an end lock portion disposed on another end side of the opening in the first direction, and intermediate lock portions disposed at both ends of the opening in a second direction when a direction passing through a center of the opening in plan view and orthogonal to the first direction is the second direction.

According to the sixth aspect, the coupling portion, the end lock portion, and the pair of intermediate lock portions are equally disposed around the opening of the luggage compartment. Therefore, since the hatch can be fixed in a well-balanced manner, rattling can be further suppressed, and the fixed state can be further strengthened.

The personal watercraft according to a seventh aspect is the personal watercraft of the first aspect, in which the coupling portion is disposed on a front side or a rear side of the opening, and the plurality of lock portions include an end lock portion disposed on an opposite side of the coupling portion across the opening, and an intermediate lock portion disposed between the coupling portion and the end lock portion.

According to the seventh aspect, the coupling portion and the end lock portion are disposed in front of and behind the opening of the luggage compartment, and at least one intermediate lock portion is disposed between the coupling portion and the end lock portion. Therefore, the hatch can be fixed in a well-balanced manner, and the fixed state can be further strengthened.

The personal watercraft according to an eighth aspect is the personal watercraft of the seventh aspect, in which the opening is disposed in a central region in a width direction of a front portion of the deck, the coupling portion is disposed on a front side of the opening, at a position corresponding to a center in the width direction of the opening, and the intermediate lock portion is disposed on each of a left side and a right side of the opening.

According to the eighth aspect, the coupling portion, the end lock portion, and the intermediate lock portions serving as fixing portions are respectively disposed on the front, rear, left, and right of the opening of the luggage compartment. Therefore, rattling of the hatch can be further reduced, and the hatch can be more firmly fixed. The watertightness of the luggage compartment by the hatch can also be improved.

The personal watercraft according to a ninth aspect is the personal watercraft of the fifth aspect, in which the coupling portion and the plurality of lock portions are disposed so as to surround a periphery of the opening.

According to the ninth aspect, the hatch can be fixed in a well-balanced manner by the coupling portion and the plurality of lock portions arranged so as to surround the opening.

The personal watercraft according to a tenth aspect is the personal watercraft of the fifth aspect, in which the coupling portion and the plurality of lock portions are disposed at positions adjacent to a periphery of the opening.

According to the tenth aspect, since the coupling portion and the plurality of lock portions are disposed adjacent to the periphery of the opening, the sealing property is easily increased, and the watertightness of the luggage compartment by the hatch can be improved.

The personal watercraft according to an eleventh aspect is the personal watercraft of the first aspect, in which the plurality of lock portions include a plurality of types of lock portions having different aspects of the engagement.

According to the eleventh aspect, the plurality of lock portions can be provided with a lock structure suitable for each arrangement place. For example, in consideration of the orientation of the force applied to the hatch, a lock structure with less rattling can be set in each lock portion.

The personal watercraft according to a twelfth aspect is the personal watercraft of the second aspect, in which the second lock portion includes an engaged rod provided in the ship body and an engagement member provided in the hatch and engageable with the engaged rod, the engagement member includes an upper portion having a pivot shaft for pivoting the engagement member, and a lower portion having a hook that engages with the engaged rod so as to hold the engaged rod by pivot of the engagement member about the pivot shaft, and a shaft center of the engaged rod is disposed downstream relative to a virtual line extending vertically downward from the pivot shaft in a pivot direction when the engagement member unlocks engagement with the engaged rod.

According to the twelfth aspect, the engagement state of the engagement member with the engaged rod can be maintained by the own weight of the engagement member. Therefore, even if a failure occurs in a mechanism for maintaining a locked state to a plurality of lock portions, such as a link mechanism or a biasing spring, the locked state of the hatch can be maintained.

The personal watercraft according to a thirteenth aspect is the personal watercraft of the first to twelfth aspects, in which the transmission member includes a displacement member, a main transmission member that transmits an operation force of the operation lever to the displacement member to displace the displacement member, and a distribution transmission member that transmits a displacement force of the displacement member to the plurality of lock portions as power for the unlock.

According to the thirteenth aspect, the displacement member can be disposed at a position away from the operation lever by the main transmission member, and the structure near the operation lever can be simplified. The displacement force of the displacement member is distributed to the plurality of lock portions by the distribution transmission member. Therefore, a transmission path of the displacement force by the main transmission member can be easily simplified as compared with the structure in which the displacement force is transmitted from the operation lever to the lock portion.

The personal watercraft according to a fourteenth aspect is the personal watercraft of the thirteenth aspect, in which at least one of the main transmission member and the distribution transmission member is made of a wire.

According to the fourteenth aspect, a displacement force transmission system by the main transmission member and the distribution transmission member can be simplified, and space saving can be easily achieved.

The personal watercraft according to a fifteenth aspect is the personal watercraft of the thirteenth aspect, in which at least one of the main transmission member and the distribution transmission member is formed of a link rod.

According to the fifteenth aspect, adoption of the link rod enables attachment of a biasing member or the like to be omitted.

The personal watercraft according to a sixteenth aspect includes a ship body, a luggage compartment provided in the ship body and provided with an opening for taking in and out luggage, a hatch attached to the ship body and capable of opening and closing the opening, and a lock mechanism for fixing the hatch to the ship body in a state where the opening is closed, in which the lock mechanism includes a lock portion that engages the hatch with the ship body, an operation lever disposed at a position separated from the lock portion, and a transmission member that transmits an operation action of the operation lever to the lock portion to unlock the engagement of the lock portion.

According to the sixteenth aspect, use of the transmission member enables the operation lever to be disposed at a position where the driver can easily operate. This makes it easy to perform the opening/closing work of the hatch on water.

What is claimed is:

1. A personal watercraft comprising:

a ship body;

a luggage compartment in the ship body and including an opening for taking in and out luggage;

a hatch attached to the ship body and capable of opening and closing the opening; and a lock mechanism that fixes the hatch to the ship body in a state where the opening is closed, wherein the lock mechanism includes:

a plurality of lock portions that provide a corresponding plurality of engagements of the hatch and the ship body with each other, a single operation lever that causes the plurality of lock portions to unlock the corresponding plurality of engagements in an interlocking manner, and a transmission member that transmits an operation action of the single operation lever to the plurality of lock portions to unlock the corresponding plurality of engagements of the lock portions to enable opening of the hatch.

2. The personal watercraft according to claim 1, wherein:

the plurality of portions leeks include:

a first lock portion in which the corresponding engagement is unlocked by operation of the single operation lever, and a second lock portion disposed at a position separated from the first lock portion, the transmission member transmits, to the second lock portion, an operation action of the single operation lever for unlocking engagement of the first lock portion.

3. A personal watercraft, comprising:

a ship body;

a luggage compartment in the ship body and including an opening for taking in and out luggage;

a hatch attached to the ship body and capable of opening and closing the opening; and a lock mechanism that fixes the hatch to the ship body in a state where the opening is closed, wherein the lock mechanism includes:

a plurality of lock portions to have an engagement of the hatch and the ship body with each other, a single operation lever that causes the plurality of lock portions to unlock the engagement in an interlocking manner, and a transmission member that transmits an operation action of the single operation lever to the plurality of lock portions to unlock the engagement of the lock portions to enable opening of the hatch, wherein:

the hatch includes an inner member opposing the opening, an outer member attached to the inner member, and an internal space defined by the inner member and the outer member, and the transmission member is disposed in the internal space.

4. The personal watercraft according to claim 1, wherein:

the ship body includes a hull and a deck covering an upper surface of the hull, and the opening of the luggage compartment is disposed in a front portion of the deck.

5. The personal watercraft according to claim 4, wherein:

the hatch includes a coupling portion to be coupled with the deck.

6. The personal watercraft according to claim 5, wherein:

when a direction passing through a center of the opening in plan view and extending in a discretionary horizontal direction is a first direction, the coupling portion is disposed on one end side of the opening in the first direction, and the plurality of lock portions include:

an end lock portion disposed on another end side of the opening in the first direction, and intermediate lock portions disposed at both ends of the opening in a second direction when a direction passing through a center of the opening in plan view and orthogonal to the first direction is the second direction.

7. The personal watercraft according to claim 5, wherein:

the coupling portion is disposed on a front side or a rear side of the opening, and the plurality of lock portions include an end lock portion disposed on an opposite side of the coupling portion across the opening, and an intermediate lock portion disposed between the coupling portion and the end lock portion.

8. The personal watercraft according to claim 7, wherein:

the opening is disposed in a central region in a width direction of a front portion of the deck, the coupling portion is disposed on a front side of the opening, at a position corresponding to a center in the width direction of the opening, and the intermediate lock portion is disposed on each of a left side and a right side of the opening.

9. The personal watercraft according to claim 5, wherein:

the coupling portion and the plurality of lock portions are disposed so as to surround a periphery of the opening.

10. The personal watercraft according to claim 5, wherein:

the coupling portion and the plurality of lock portions are disposed at positions adjacent to a periphery of the opening.

11. The personal watercraft according to claim 1, wherein:

the plurality of lock portions include a plurality of types of lock portions having different forms of the engagement.

12. The personal watercraft according to claim 2, wherein:

the second lock portion includes an engaged rod in the ship body and an engagement member in the hatch and engageable with the engaged rod, the engagement member includes an upper portion including a pivot shaft for pivoting the engagement member, and a lower portion including a hook that engages with the engaged rod so as to hold the engaged rod by pivot of the engagement member about the pivot shaft, and a shaft center of the engaged rod is disposed downstream relative to a virtual line extending vertically downward from the pivot shaft in a pivot direction when the engagement member unlocks engagement with the engaged rod.

13. The personal watercraft according to claim 1, wherein the transmission member includes:

a displacement member, a main transmission member that transmits an operation force of the single operation lever to the displacement member to displace the displacement member, and a distribution transmission member that transmits a displacement force of the displacement member to the plurality of lock portions as power for the unlock.

14. A personal watercraft, comprising:

a ship body;

a luggage compartment in the ship body and including an opening for taking in and out luggage;

a hatch attached to the ship body and capable of opening and closing the opening; and a lock mechanism that fixes the hatch to the ship body in a state where the opening is closed, wherein the lock mechanism includes:

a plurality of lock portions to have an engagement of the hatch and the ship body with each other, a single operation lever that causes the plurality of lock portions to unlock the engagement in an interlocking manner, and a transmission member that transmits an operation action of the single operation lever to the plurality of lock portions to unlock the engagement of the lock portions to enable opening of the hatch, the transmission member including:

a displacement member, a main transmission member that transmits an operation force of the single operation lever to the displacement member to displace the displacement member, and a distribution transmission member that transmits a displacement force of the displacement member to the plurality of lock portions as power for the unlock, and wherein at least one of the main transmission member and the distribution transmission member includes a wire.

15. The personal watercraft according to claim 13, wherein:

at least one of the main transmission member and the distribution transmission member includes a link rod.

16. The personal watercraft according to claim 1, wherein:

the single operation lever consists of a single, unitary member, that causes the plurality of lock portions to unlock the corresponding plurality of engagements in the interlocking manner.

17. The personal watercraft according to claim 1, wherein:

the plurality of lock portions each include a corresponding locking element which locks the hatch to ship body.

18. The personal watercraft according to claim 17, wherein:

each of the locking elements includes a locking element selected from a group consisting of a locking pin and a locking rod.

* * * * *